United States Patent
Jacoby

(10) Patent No.: US 11,188,402 B2
(45) Date of Patent: Nov. 30, 2021

(54) LOCATIONS IMPRESSIONS APPLICATION PROGRAMMING INTERFACE

(71) Applicant: Google LLC, Mountain View, CA (US)

(72) Inventor: Mackenzie Lee Jacoby, Pyrmont (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/625,402

(22) PCT Filed: Nov. 17, 2017

(86) PCT No.: PCT/US2017/062225
§ 371 (c)(1),
(2) Date: Dec. 20, 2019

(87) PCT Pub. No.: WO2019/099023
PCT Pub. Date: May 23, 2019

(65) Prior Publication Data
US 2021/0026716 A1 Jan. 28, 2021

(51) Int. Cl.
*G06F 9/54* (2006.01)
*G06F 16/9537* (2019.01)
*G06F 16/29* (2019.01)

(52) U.S. Cl.
CPC .............. *G06F 9/547* (2013.01); *G06F 16/29* (2019.01); *G06F 16/9537* (2019.01)

(58) Field of Classification Search
CPC ....................................................... G06F 9/547
USPC ........................................................ 719/328
See application file for complete search history.

(56) References Cited

U.S. PATENT DOCUMENTS

| 8,812,647 | B1* | 8/2014 | Jain ..................... H04L 41/0213 709/223 |
| 9,325,798 | B1 | 4/2016 | Buisman et al. |
| 2012/0123867 | A1 | 5/2012 | Hannan |
| 2015/0006526 | A1 | 1/2015 | Duleba et al. |
| 2015/0220602 | A1* | 8/2015 | Billou ................ G06Q 30/0625 705/26.62 |
| 2018/0307739 | A1* | 10/2018 | Grochocki, Jr. ...... G06F 16/285 |

FOREIGN PATENT DOCUMENTS

WO    WO2011/134020    11/2011

OTHER PUBLICATIONS

International Preliminary Report on Patentability for PCT/US20171062225, dated Apr. 6, 2020, 20 pages.
International Search Report and Written Opinion for Application No. PCT/US2017/062225, dated May 17, 2018, 12 pages.

* cited by examiner

*Primary Examiner* — Timothy A Mudrick
(74) *Attorney, Agent, or Firm* — Dority & Manning, P.A.

(57) ABSTRACT

The present disclosure provides systems and methods for determining location point quality. In one example, a computer-implemented method is provided which includes obtaining, by one or more computing devices, obtaining, by one or more computing devices, one or more location point reports for a location point. The method further includes generating, by the one or more computing devices, location point score modifier for the location point based on one or more location point reports. The method further includes providing, by the one or more computing devices, the location point score modifier for use in determining candidate location points for generation of location-based application content.

20 Claims, 5 Drawing Sheets

LOCATIONS IMPRESSIONS APPLICATION PROGRAMMING INTERFACE

PRIORITY CLAIM

The present application is based upon and claims the right of priority under 35 U.S.C. § 371 to International Application No. PCT/US2017/062225 filed on Nov. 17, 2017, which is incorporated herein by reference in its entirety.

FIELD

The present disclosure relates generally to application programming interfaces for providing geographic information feedback.

BACKGROUND

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include applications that make varied geographic information available to users.

Application programming interfaces can allow applications implemented on computing devices to interact with various services to provide information and functionality to a user. Application programming interfaces can provide a tool for developers to easily embed information, programming, services, frameworks, and structures into applications for access by the user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for determining location quality. The method can include obtaining, by one or more computing devices, one or more location point reports for a location point. The method can further include generating, by the one or more computing devices, location point score modifier for the location point based on one or more location point reports. The method can further include providing, by the one or more computing devices, the location point score modifier for use in determining candidate location points for generation of location-based application content.

Another example aspect of the present disclosure is directed to a computing device. The computing device includes one or more processors and one or more non-transitory computer-readable media that store instructions. The instructions, when executed by the one or more processors, cause the computing device to cause the computing device to perform operations. The operations include obtaining one or more location point reports for a location point. The operations further include generating location point score modifier for the location point based on one or more location point reports. The operations further include providing the location point score modifier for use in determining candidate location points for generation of location-based application content.

Another example aspect of the present disclosure is directed to one or more non-transitory computer-readable media that store instructions that, when executed by one or more processors of a computing system, cause the computing system to perform operations. The operations include obtaining one or more location point reports for a location point. The operations further include generating location point score modifier for the location point based on one or more location point reports. The operations further include providing the location point score modifier for use in determining candidate location points for generation of location-based application content.

Other example aspects of the present disclosure are directed to systems, apparatus, tangible, non-transitory computer-readable media, user interfaces, memory devices, and electronic devices associated with an application programming interface for providing geographic information, for instance, to developers of location based-gaming applications.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
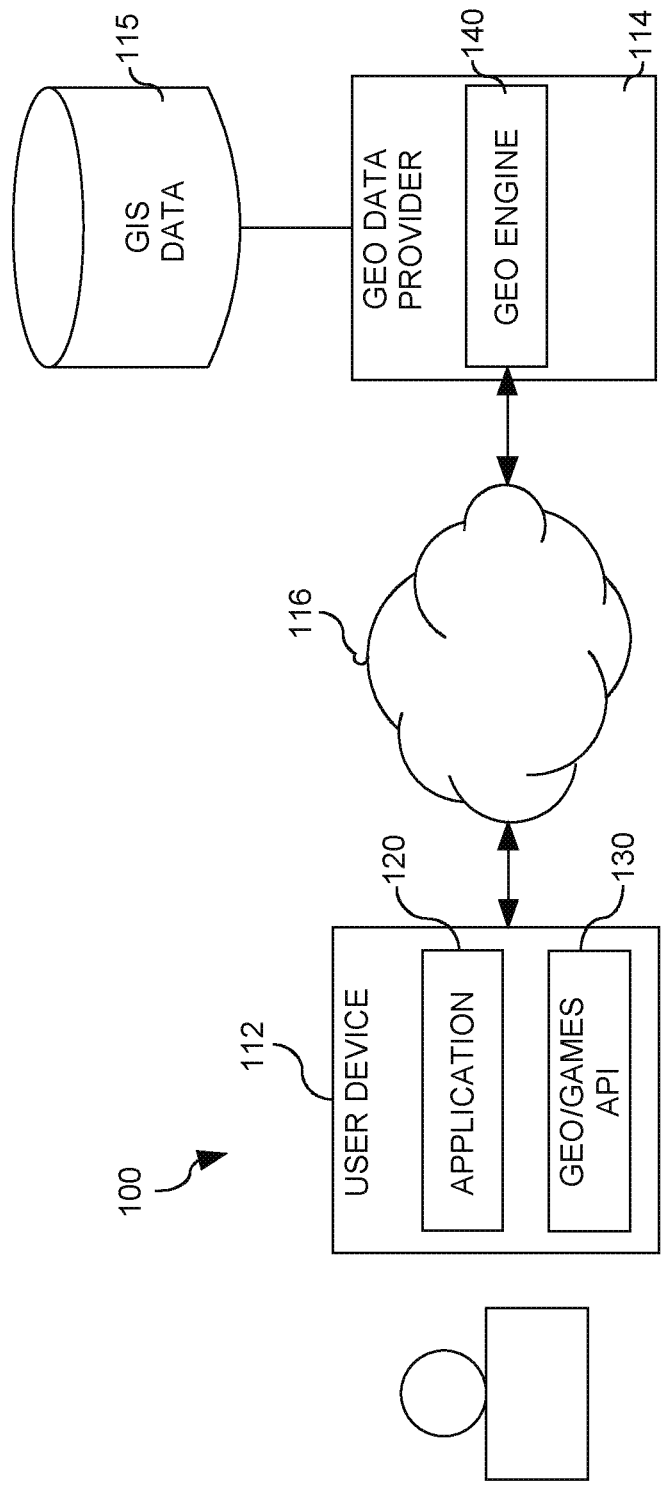
FIG. 1 depicts an overview of an example system for implementing a locations impressions service as part of a software application using an application programming interface according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for obtaining feedback on geographic information from software applications implemented on one or more computing devices, such as web-based software applications implemented in a browser, locally-stored software applications, and other applications. In some embodiments, the API can allow application developers to provide feedback on geographic information provided by a geographic data provider or other source in their software application. For example, a geographic data provider can provide an application developer with real world points to use in applications, such as location-based gaming applications. The API can allow a developer to provide feedback on such location points, for example, reporting points that may not be appropriate for use in an application for a variety of reasons, such as points on restricted property, unsafe points, points with poor access, and/or the like. The feedback can then be used to update geographic information datasets provided to application developers by the geographic data provider, such as by blacklisting points and/or adjusting point scoring. While some of the embodiments and examples described herein are related to location-based gaming applications, the embodiments are not limited to such. Embodiments may be applicable to a variety of mobile services outside of gaming and used in the development of safe, social, and immersive mobile applications.

More specifically, the API, when invoked by a software application implemented on a computing device, can be configured to provide for submitting reports on geographic information used within the software application (e.g., explicit user feedback on points, impressions logging, and/or the like) to a data provider via a communication interface (e.g., over a network, such as the Internet). For example, in some embodiments, the API may be associated with a playability service for application developers. The playability service can provide for generating a list or dataset of candidate locations for a region. The playability service can provide candidate location datasets including one or more candidate locations in a for an application developer to use within an application, such as for placing in-game objects within a location-based gaming application. In some embodiments, the application can generate reports regarding the quality and/or suitability of one or more location points used within the application. The API can provide for submitting these reports to a data provider such that the reports can be used to update the candidate location datasets provided by the playability service.

According to an example aspect of the present disclosure, in some embodiments, the API may provide an location impressions service for obtaining feedback (e.g., reports) on geographic information (e.g., location points) provided by a playability service that are used within an application, such as obtaining feedback on game object location quality within a location-based gaming application. The API can obtain report data that includes explicit user feedback and/or in-app logging of locations presented to a user. The API can provide for submitting these reports to impressions service. The impressions service can aggregate and analyze the submitted reports for use in updating location data maintained by a data provider, for example, by modifying the scoring of location points and/or adding location points to a blacklist.

In some embodiments, the reports can include explicit user feedback where an application user can report an inappropriate location that is being presented in the application. The user can generate a feedback report that includes an identifier of the location point being reported and a reason why the location point is inappropriate for use in the application. For example, in some embodiments, a feedback report can include a location point identifier, a reason selected from a predefined list, and an optional freeform explanation text field. In some embodiments, a developer may limit the ability to generate feedback reports to a subset of users, such as quality assurance testers, for example. Alternatively, in some embodiments, a developer may provide for any user to generate feedback reports.

In some embodiments, the reports can include in-app logging of when location points are presented to a user and when the user interacts with the location point (e.g., impressions). These logs (e.g., impressions) can be used to determine location points that are displayed to a user but where players do not interact with the location points. The impressions logging can be used to compare how often a location point is interacted with by a user with how often the location point is presented to a user. For example, such information can indicate that location points that are not interacted with by users even though they are presented to the user are inappropriate, such as location points that are not easily accessible.

In some embodiments, location displayed impressions can be logged when a user is presented with a new location point that they can interact with. Interaction impressions can then be logged when the user interacts with the location point. In some embodiments, once a location displayed impression is logged for a location point, no further location displayed impressions are logged in that session until the user interacts with the location point, for example, to avoid repeated location displayed impressions if the location point comes in and out of the application viewport. After an interaction impression is logged for that location point, another location displayed impression can be logged if the location point becomes available to the user again.

In some embodiments, different applications and different in-app objects can have different displayed to interaction ratios. To allow for such differences, an in-app object type can be included with each impressions log. A raw impressions score can then be generated for each (application, in-app type, location point) tuple. For example, for each (application, in-app type, location point) tuple, a raw impressions score can be defined as the number of times that location point was interacted with divided by the number of times the location point was presented to the user in the given application with the given in-app type. In some embodiments, an average raw score can be generated for each (application, in-app type) pair. For example, for each (application, in-app type) pair, an average raw score can be calculated over all location points having that constraint. A final impression score can be assigned as the ratio of the raw impression score to the average raw score.

In some embodiments, time based weighting and cutoffs can be implemented to account for situations such as location points that used to be good but are now bad and/or location points that were only just displayed but the user did not have the time to interact with it yet. In some embodiments, the total number of impressions at each location point can be taken into account as a measure of uncertainty. For example, in some embodiments, the number of impressions n can be converted into uncertainty using uncertainty=1+C/$\sqrt{n}$ for some constant C. This drops from (1+C) when n=1 to approximately 1 for large values of n.

In some embodiments, application specific location blacklists can be maintained. To provide for application specific location blacklists, an application identifier can be included with each report to identify the application the report is submitted from. For example, in some embodiments, a new API key can be used for each application developed by a developer, and the application can be identified in the report by the API key.

In some embodiments, reports can additionally be obtained from sources other than the application. For example, in some embodiments, an application developer and/or a business owner (e.g., business where an application may be used such as where a game can be played) can submit reports to the impressions service for use in updating location point data provided for an application for use in generating location-based content.

In some embodiments, an impressions service can include abuse prevention measures. For example, since users submitting feedback reports may not be authenticated, it may be possible for a malicious user to submit numerous fake reports. As such, in some embodiments, the impressions service can store IP addresses for a defined period of time (e.g., one day, etc.) and ignore reports submitted by an IP address if more than some threshold number of reports come from the same IP address in that period of time. For example, in some embodiments, unauthenticated feedback reports can be stored in a separate location (e.g., a staging table and/or the like) together with the IP address that the report was submitted from for the designated time period. The remaining reports after the time period expires (e.g., reports that pass the abuse check) can then be forwarded to a report table and stored along with authenticated feedback reports and impressions.

In some embodiments, the impressions service can provide for a blacklisting and/or score modification service. For example, the reports submitted via the API can be used to add location points that should not be displayed to users to a blacklist and/or used to assign a score modifier to location point scores used in determining what location points should be selected for use in an application. In some embodiments, the reports can be used to suggest location points that should reviewed for placement on a location blacklist, rather than automatically assigning a location point to a blacklist.

The blacklisting and/or score modification service can receive the data from the submitted feedback reports and impressions as input. For example, each (application, location point) can have a list of submitted feedback reports and each (application, in-app type, location point) from the impressions can have a final impression score value and an uncertainty value.

In some embodiments, feedback reports can be used to generate a score multiplier calculated as bad_place_multiplier=min(1, A/n) where n is the number of bad place reports. In some embodiments, where feedback reports only come from quality assurance testers, A can be set to 1 (e.g., so two reports will result in score of 0.5, 10 reports in score of 0.1). In some embodiments, A can be increased where feedback reports are received from regular users. The bad_place_multiplier can be computed both per application and globally. In some embodiments, a final bad place multiplier can be generated using the geometric mean of the two: $\sqrt{bad\_place\_multiplier(game) \cdot bad\_place\_multiplier(global)}$.

In some embodiments, impressions can be used to generate a score multiplier for each (application, in-app type, location point) computed as impression multiplier=1+(computed score−1)/uncertainty. This will leave the multiplier close to 1 unless the uncertainty is low. For each location point, the geometric mean of impression multipliers can be calculated for each in-app type, both per application and globally. Again, the final multiplier for a (application, place) pair can be the geometric mean of the per application and global multipliers.

When location point scores are needed, for example, to determine candidate location points for an application, the location point raw score can be multiplied with the bad place multiplier and impression multiplier. In some embodiments, cutoffs for the multipliers can be provided, so that if they fall below the cutoff, the location point is blacklisted.

FIG. 1 depicts an overview of an example system 100 for implementing a location impressions service as part of a software application using an API according to example embodiments of the present disclosure. The system 100 can include a user device 112 that can receive geographic data from a geographic data provider 114 via a communication network 116. The user device 112 can be, for instance, a smartphone, tablet, wearable device, laptop, desktop, mobile device, device capable of being carried by a user while in operation, display with one or more processors, vehicle system, or other user device 112.

A software application 120 can be implemented on the user device 112. The software application can be, for instance, a developer application, a browser, a game application, an application used to assist with delivery, a social media application, or other software application that may need to provide geographic information to a user. The software application 120 can be stored locally on the user device 112 or can be, for instance, a web application accessed via a browser implemented on the user device 112. In some embodiments, the software application 120 can be developed by a third party entity that is independent of and/or not affiliated with an entity associated the geographic data provider 114.

The software application 120 can invoke an API 130 to access and provide geographic data from the geographic data provider 114 via the communication network 116 so that a geographic data service can be embedded in the software application 120. Example aspects of the present disclosure are discussed with accessing data from a remote geographic data provider 114 for purposes of illustration and discussion. Those of ordinary skill in the art, using the disclosures provided herein, will understand that the API 130 can access data from other sources, such as local sources or applications located on the user device 112.

The geographic data service can present geographic information (e.g., map geometry, map metadata, location properties, location datasets, real time signals, location intelligence) to a user. The user may be a third party developer who may use the geographic information in providing a location aware application such as a location-based game. For example, the geographic information may provide the developer with intelligent and relevant suggestions of where to spawn objects or activities within a game environment that align with real world locations that are safe, appropriate, and ideal locations for game play.

Referring back to FIG. 1, the API 130 can be configured to interface with a geo/games engine 140 implemented by the geographic data provider 114. The API 130 can further be configured to obtain feedback reports and/or impression logging from an application on the user device 112, such as application 120. The feedback reports and/or impressions logging can provide intelligence related to location quality for in-application object locations, such as locations of in-game objects in a location-based gaming application. The geo/games engine 140 can be configured to, for instance, access mapping data and signals, create and/or update location datasets based on various events or feedback, generate location intelligence signals, and respond to requests for geographic data from the API 130. In some embodiments, the geographic data provider 114 can include one or more servers, such as web servers. The one or more servers can include one or more processors and one or more memory devices. The one or more memory devices can store computer-readable instruction to implement, for instance, the geo/games engine 140. In some embodiments, the geo/games engine 140 can access data associated, for instance, with a geographic information system 115. The geographic information system 115 can include data that indexed by geographic coordinates of its elements. The data associated with the geographic information system 115 can include, for instance, map data, route data, geographic imagery, data associated with various waypoints (e.g., business listing names, addresses, geographic coordinates, etc.), real-time signals (e.g., usage or traffic patterns), and other data.

The application 120 can implement a geographic information service by interacting with the geographic data provider 114 via the API 130 over the network 116. The network 116 can be any type of communications network, such as a local area network (e.g. intranet), wide area network (e.g. Internet), cellular network, or some combination thereof. The network 116 can also include a direct connection. In general, communication can be carried via network 116 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 2:
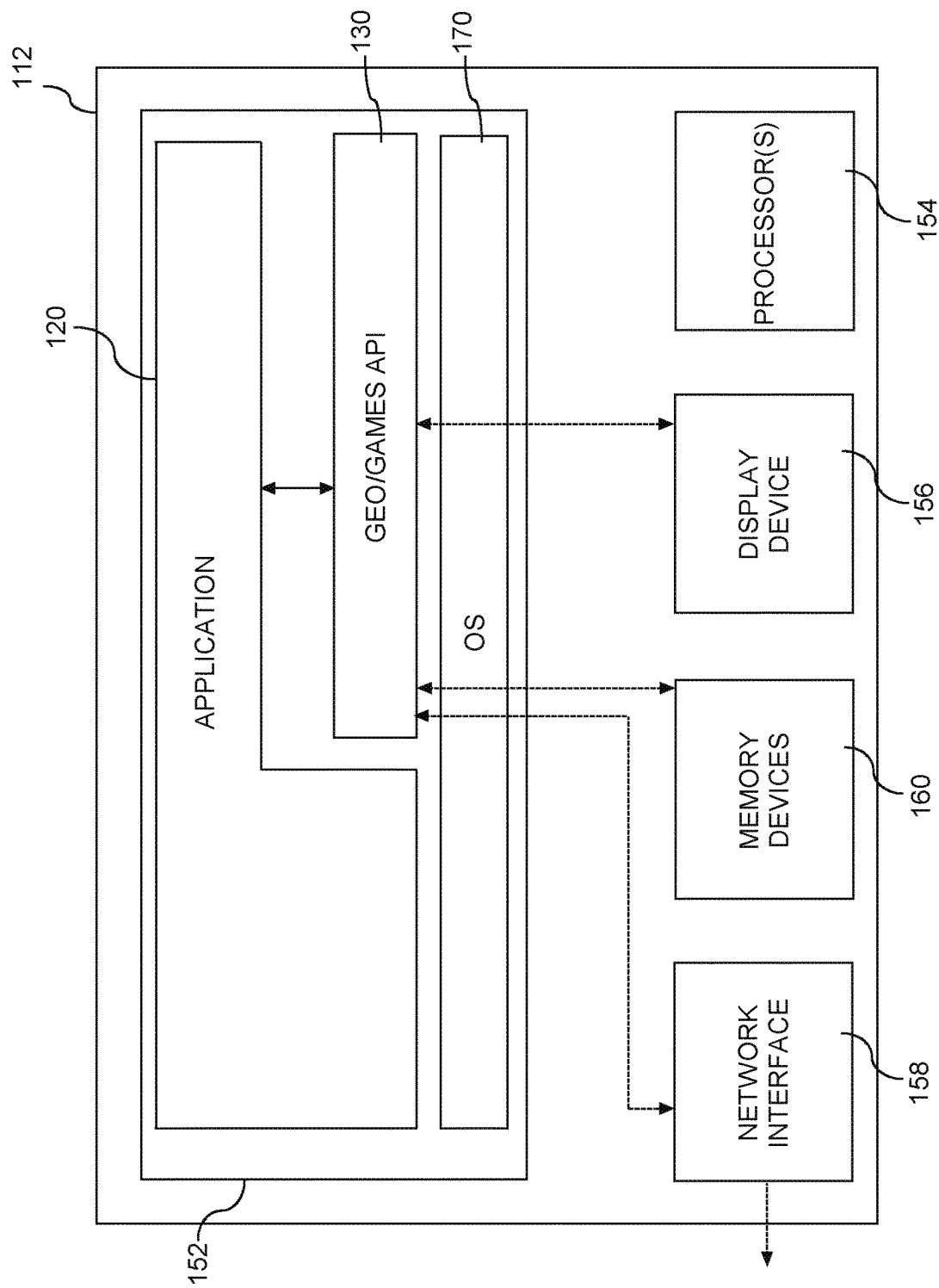
FIG. 2 depicts a block diagram of an example user device implementing a software application according to example embodiments of the present disclosure.

FIG. 2 depicts an example user device 112 configured to implement one or more API 130 according to example embodiments of the present disclosure. As shown, the user device 112 includes an instruction memory 152, one or more processors 54 configured to execute instructions stored in the memory 152, a display device 156, a network interface 158 that supports network communications, and a storage memory 160. For clarity, the instruction memory 152 and the storage memory 160 are illustrated separately. It will be understood, however, that the components 152 and 160 also can be regions within the same memory module. More generally, the user device 112 can include one or several additional processors, memory devices, network interfaces, which may be provided separately or on a same chip or board. Further, the components 152 and 160 may include persistent memory (e.g., flash memory), volatile memory (e.g., RAM), or both, or other suitable memory.

The instruction memory 52 can store sets of instructions of an operating system (OS) 170, an API 130, and a software application 120. The OS 170 can be a mobile OS developed specifically for mobile devices. As such, the OS 170 can include functions that allow the software application to access data such as wireless network parameters (e.g., identity of the wireless network, quality of service), as well as invoke such services as telephony, location determination (e.g., via global positioning service (GPS) or WLAN), wireless network data call origination, etc. In other implementations, the OS 170 is a general-purpose operating system that operates on both mobile and stationary devices, such as smartphones and desktop computers, for example. In some example implementations, the OS includes or based upon an Android® mobile operating system developed by Google Inc. or similar operating system to implement an Android operating platform. However, other suitable operating systems can be used without deviating from the scope of the present disclosure.

The software application 120 can be, for example, a developer application, a navigation application, gaming application, an application to assist with delivery, a social media application, etc. Further, the software application 120 can be a web browser application that invokes the API 130 to provide geographic information within an allocated portion of a browser window. In general, the API 130 can be made available to any suitable software application that executes on the user device 112. Also, multiple different software applications may invoke the API 130.

As discussed above, the software application 120 can invoke the API 130 to embed a geographic information service in the software application 120. For instance, in one example, a software application 120 can provide one or more queries to the API 130. The API 130 can request geographic data from a remote geographic data provider to determine location information (e.g., location scores, location suggestions, traffic patterns, usage patterns, map geometry, map metadata, real-time signals, etc.) based on the one or more queries. The API 130 can include sets of instructions to control the presentation of geographic information to the user as part of the geographic information service.

In some embodiments, the software application 120 can invoke the API 130 to provide feedback reports and/or location impressions logging to a remote geographic data provider where the feedback reports and/or location impressions logging can be used to update geographic information provided by the geographic data provider.

In some embodiments, the positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position.

The API 130 can be implemented as one or several functions, a data structure, etc. Further, the API 130 may include compiled code that executes directly on the processor(s) 154 or, alternatively, instructions in any other form such as a scripting language interpreted at runtime by the application 120. The API 130 in one example implementation includes well-documented prototypes of several functions which a developer can include in the code of the software application 120, as well as instructions that implement these functions. In some embodiments, the API 130 can be provided to the developer as a static library.

Figure 3:
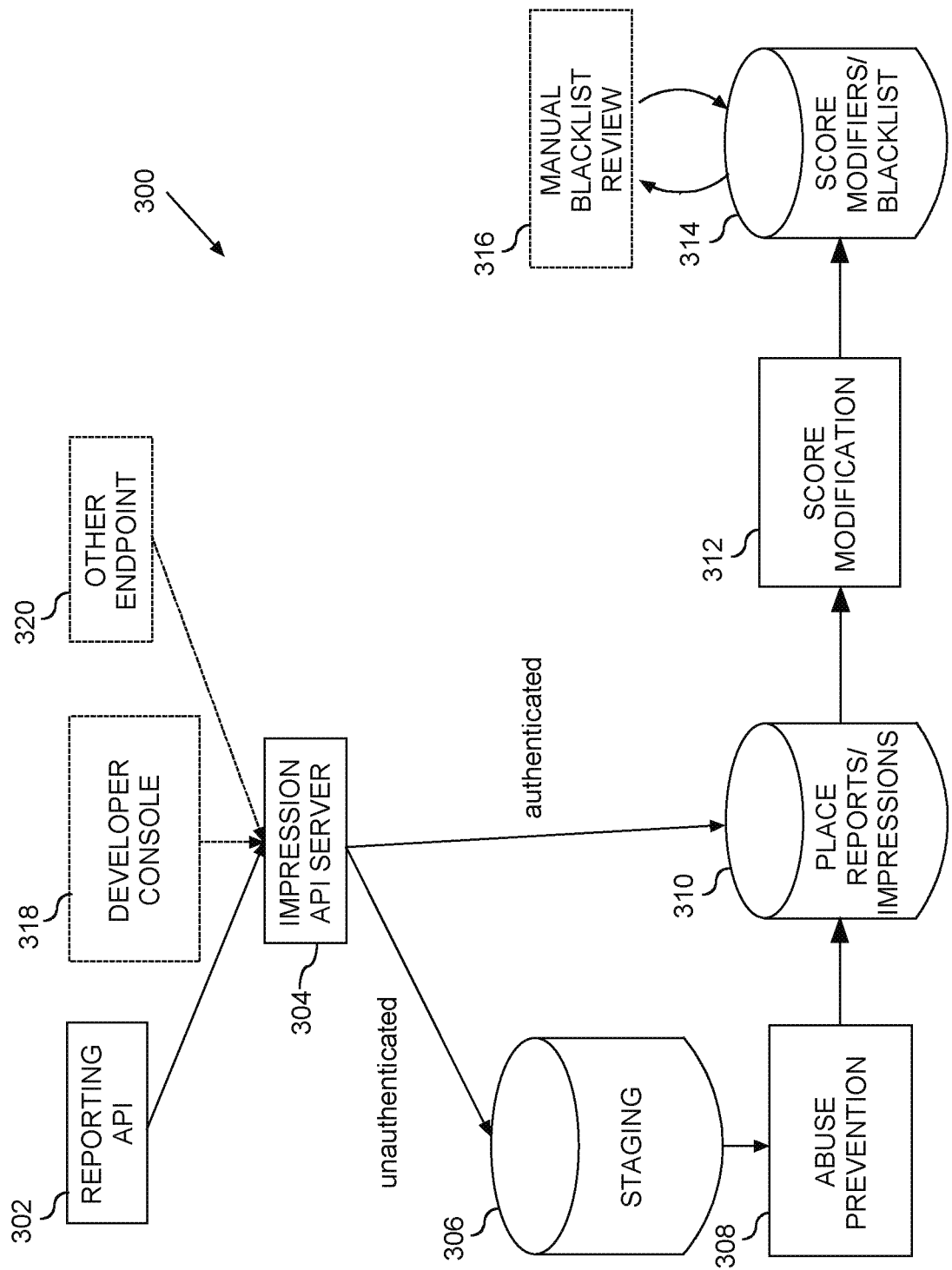
FIG. 3 depicts a block diagram of an example locations impressions system according to example embodiments of the present disclosure.

FIG. 3 depicts a block diagram of an example locations impressions system 300 according to example embodiments of the present disclosure. As described herein, a location impressions system can provide for obtaining in-application feedback on location quality for in-application object locations, where the feedback can be used to update geographic information provided for use in such applications. In some embodiments, the location impressions system 300 can include and reporting API 302 and impressions API server 302. In some embodiments, the impressions API server 304 can include staging storage 306, abuse prevention service 308, reports/impressions storage 310, score modification service 312, and score modifiers/blacklist storage 314.

As described herein, the reporting API 302 can be called by an application to provide feedback reports and/or impressions to a location impressions service (e.g., impressions API server 304). The impressions API server 304 can serve requests from the reporting API 302 to obtain the feedback reports and/or impressions. In some embodiments, the impressions API server 304 can optionally serve requests from one or more developer consoles 316 and/or one or more other endpoints 318 to obtain location quality feedback reports.

The impressions API server 304 can write the received feedback reports and/or impressions to storage locations based on whether the reports are authenticated or unauthenticated. Unauthenticated reports can be written to staging storage 306 such that an abuse prevention service 308 can provide an abuse check of the unauthenticated reports. For example, the abuse prevention service can review unauthenticated reports over a defined time period (e.g., one day) to delete any fraudulent reports (e.g., numerous fake reports submitted from the same IP address in one day and/or the like). Once the unauthenticated reports have passed the abuse check, the unauthenticated reports can be written to reports/impressions storage 310. The impressions API server 304 can write authenticated reports to the reports/impressions storage 310.

The feedback reports/impressions in reports/impressions storage 310 can be provided to a score modification service 312 for use in determining score modifiers for location points and/or for use in determining location points that should be added to a location blacklist. The score modification service 312 can store the location score modifiers (e.g., bad place multipliers, impressions multipliers, etc.), as well as any blacklisted location points to score modifiers/blacklist storage 314. In some embodiments, a manual blacklist review service 316 can be performed before any location points are added to a location blacklist. The score modifiers and location blacklist can be used, for example, by a playability service, in determining candidate locations that can be provided for use in an application, such as a location-based gaming application.

Figure 4:
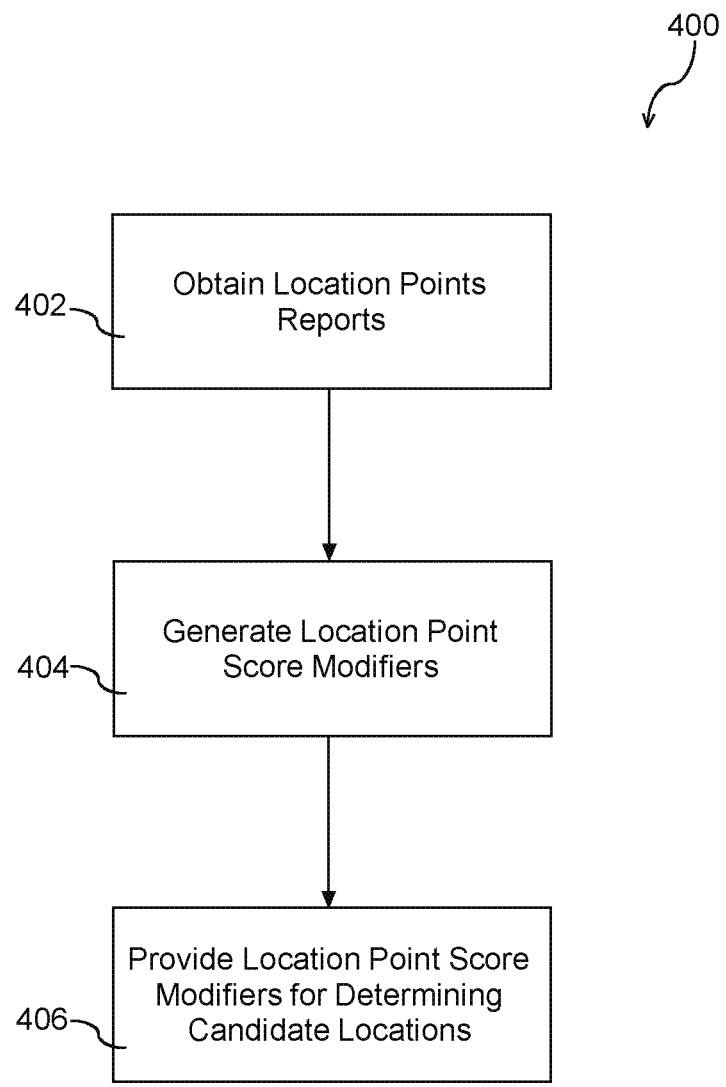
FIG. 4 depicts a flowchart diagram of example operations for obtaining location point feedback for a location impression service according to example embodiments of the present disclosure.

FIG. 4 depicts a flowchart diagram of example operations 400 for obtaining location point feedback for a location impression service according to example embodiments of the present disclosure.

At 402, a computing system, such as geo data provider 114, for example, can obtain one or more location point reports for a location point. For example, a geographic data provider can provide location points for use in generating location-based content in an application, such as location-based gaming applications. An API can provide for submission of feedback (e.g., location point reports) on the quality and/or suitability of such location points in regard to their use for location-based application content, for example, reporting points that may not be appropriate for use in an application for a variety of reasons, such as points on restricted property, unsafe points, points with poor access, and/or the like.

For example, the API can be invoked by a software application implemented on a user computing device and the API can be configured to provide for submitting reports on geographic information used within the software application (e.g., explicit user feedback on points, impressions logging, and/or the like) to the computing system (e.g., data provider computing system). In some embodiments, the location point reports can include explicit user feedback where an application user can report an inappropriate location that is being presented in the application. In some embodiments, the reports can include in-app logging of when location points are presented to a user and when the user interacts with the location point (e.g., impressions logging). The impressions logging can be used to compare how often a location point is interacted with by a user with how often the location point is presented to a user.

At 404, the computing system can generate location point score modifiers for the location point based on one or more location point reports. For example, the location point reports can be used to update geographic information datasets which may be provided to application developers for use in generating location-based application content, such as by blacklisting location points and/or adjusting location point scoring. In some embodiments, a blacklisting and/or score modification service can receive the data from the location point reports (e.g., user feedback and impressions logs) as input. For example, each (application, location point) can have a list of submitted user feedback reports and each (application, in-app type, location point) from the impressions log reports can have a final impression score value and an uncertainty value.

At 406, the computing system can provide the location point score modifiers for use in determining candidate location points for generation of location-based application content. For example, when location point scores are needed, for example, to determine candidate location points for an application to use in generating location-based application content, a location point raw score can be multiplied with a bad place multiplier (e.g., generated based on the user feedback reports) and an impression multiplier (e.g., generated from the impressions logs). In some embodiments, cutoffs for the multipliers can be provided, so that if they fall below the cutoff, the location point is blacklisted.

Figure 5:
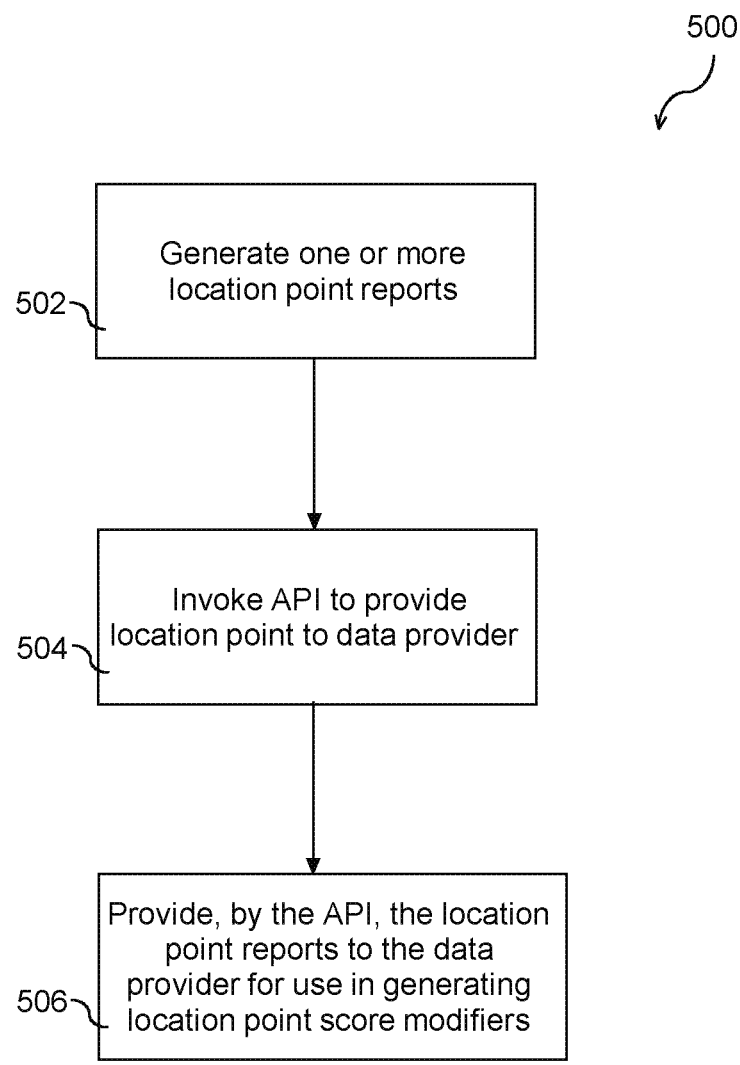
FIG. 5 depicts a flowchart diagram of example operations for obtaining location point feedback from a user device according to example embodiments of the present disclosure.

FIG. 5 depicts a flowchart diagram of example operations 500 for obtaining location point feedback from a user device according to example embodiments of the present disclosure.

At 502, a computing device, such as user device 112, for example, can generate one or more location point reports for location points associated with location-based application content. For example, in some embodiments, the computing device (e.g., software application on a user device) can generate location point reports that can include explicit user feedback by which an application user can report an inappropriate location that is being presented in an application (e.g., associated with location-based application content). In some embodiments, the computing device (e.g., software application on a user device) can generate location point reports which include in-app logging (e.g., impressions logging) of when location points are presented to a user (e.g., associated with location-based application content) and when the user interacts with the location point. The impressions logging can be used to compare how often a location point is interacted with by a user with how often the location point is presented to a user.

At 504, the computing device can invoke an API installed on the user device to provide the one or more location point reports to the remote data provider. For example, the API can be invoked by a software application implemented on the computing device and the API can be configured to provide for submitting location point reports generated by a software application (e.g., explicit user feedback on points, impressions logging, and/or the like) to a remote data provider (e.g., data provider computing system).

At 506, the computing device can provide by the API, the one or more location point reports to the remote data provider for use in generating location point score modifiers. In some embodiments, the remote data provider can generate location point score modifiers for the location point based on one or more location point reports. For example, the location point reports can be used to update geographic information datasets which may be provided to application developers for use in generating location-based application content, such as by blacklisting location points and/or adjusting location point scoring.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining location point quality, the method comprising:
   obtaining, by one or more computing devices, one or more location point reports for a location point previously presented to one or more users to interact with, wherein the one or more location point reports comprise a feedback report and an Internet Protocol (IP) address that the feedback report was submitted from, and wherein the one or more location point reports are ignored when a threshold number of the one or more location point reports are submitted from the same IP address within a designated time period;
   generating, by the one or more computing devices, a location point score modifier for the location point based on the one or more location point reports; and
   providing, by the one or more computing devices, the location point score modifier for use in determining candidate location points for generation of location-based application content.

2. The computer-implemented method of claim 1, wherein the one or more location point reports are obtained via an application programming interface call.

3. The computer-implemented method of claim 1, wherein the one or more location point reports for a location point comprises location impression logging.

4. The computer-implemented method of claim 1, wherein generating, by the one or more computing devices, the location point score modifier for the location point comprises adding the location point to a blacklist.

5. The computer-implemented method of claim 1, wherein generating, by the one or more computing devices, the location point score modifier for the location point comprises generating a multiplier that can be used to modify a location point score, and wherein the location point score reflects a suitability of the location point for use in generating location based application content.

6. The computer-implemented method of claim 1, further comprising deleting, by the one or more computing devices, one or more location point reports based on an abuse measurement before generating the location point score modifier for the location point based on one or more location point reports.

7. A computing device comprising:
   one or more processors; and
   one or more non-transitory computer-readable media that store instructions that, when executed by the one or more processors, cause the computing device to perform operations, the operations comprising:
   obtaining one or more location point reports for a location point previously presented to one or more users to interact with, wherein the one or more location point reports comprise a feedback report and an Internet Protocol (IP) address that the feedback report was submitted from, and wherein the one or more location point reports are ignored when a threshold number of the one or more location point reports are submitted from the same IP address within a designated time period;
   generating a location point score modifier for the location point based on the one or more location point reports; and
   providing the location point score modifier for use in determining candidate location points for generation of location-based application content.

8. The computing device of claim 7, wherein the one or more location point reports are obtained via an application programming interface call.

9. The computing device of claim 7, wherein the one or more location point reports for a location point comprises location impression logging.

10. The computing device of claim 7, wherein generating the location point score modifier for the location point comprises adding the location point to a blacklist.

11. The computing device of claim 7, wherein generating the location point score modifier for the location point comprises generating a multiplier that can be used to modify a location point score wherein the location point score reflects a suitability of the location point for use in generating location-based application content.

12. The computing device of claim 7, wherein the operations further cause the computing device to delete one or more location point reports based on an abuse measurement before generating the location point score modifier for the location point based on one or more location point reports.

13. One or more non-transitory computer-readable media that store instructions that, when executed by one or more processors of a computing system, cause the computing system to perform operations, the operations comprising:
   obtaining one or more location point reports for a location point previously presented to one or more users to interact with, wherein the one or more location point reports comprise a feedback report and an Internet Protocol (IP) address that the feedback report was submitted from, and wherein the one or more location point reports are ignored when a threshold number of the one or more location point reports are submitted from the same IP address within a designated time period;
   generating a location point score modifier for the location point based on the one or more location point reports; and
   providing the location point score modifier for use in determining candidate location points for generation of location-based application content.

14. The one or more non-transitory computer-readable media of claim 13, wherein the one or more location point reports are obtained via an application programming interface call.

15. The one or more non-transitory computer-readable media of claim 13, wherein generating the location point score modifier for the location point comprises adding the location point to a blacklist.

16. The one or more non-transitory computer-readable media of claim 13, wherein generating the location point score modifier for the location point comprises generating a multiplier that can be used to modify a location point score, and wherein the location point score reflects a suitability of the location point for use in generating location-based application content.

17. The computer-implemented method of claim 2, wherein the application programming interface call is received from a API on a user device, the API being invoked by a software application also installed on the user device, wherein upon receipt of one or more location point reports from the software application, the API functions to provide the one or more location point reports to a data provider for use in generating a location point score modifier.

18. A computer-implemented method for obtaining candidate locations for use in a software application installed on a user device, the user device being configured to communicate with a remote data provider, the remote data provider being configured to obtain one or more location point reports for a location point previously presented to one or more users to interact with, to generate a location point score modifier for the location point based on one or more location point reports; and to provide the location point score modifier for use in determining candidate location points for generation of location-based application content, the method comprising:

generating, by the software application, one or more location point reports for location points associated with location-based application content, wherein the one or more location point reports comprise a feedback report and an Internet Protocol (IP) address that the feedback report was submitted from, and wherein the one or more location point reports are ignored when a threshold number of the one or more location point reports are submitted from the same IP address within a designated time period;

invoking, by the software application, an API installed on the user device to provide the one or more location point reports to the remote data provider; and providing, by the API, the one or more location point reports to the remote data provider for use in generating location point score modifiers.

19. The one or more non-transitory computer-readable media of claim 13, wherein the application programming interface call is received from a API on a user device, the API being invoked by a software application also installed on the user device, and wherein upon receipt of one or more location point reports from the software application, the API functions to provide the one or more location point reports to a data provider for use in generating a location point score modifier.

20. The one or more non-transitory computer-readable media of claim 13, wherein the generating a location point score modifier for the location point based on the one or more location point reports comprises:

generating a multiplier that can be used to modify a location point score, wherein the location point score reflects a suitability of the location point for use in generating location based application content.

* * * * *